Oct. 9, 1951 G. W. GRAY 2,570,790
SIGNAL SAMPLING
Filed Dec. 31, 1949 4 Sheets-Sheet 2
*Fig_3*
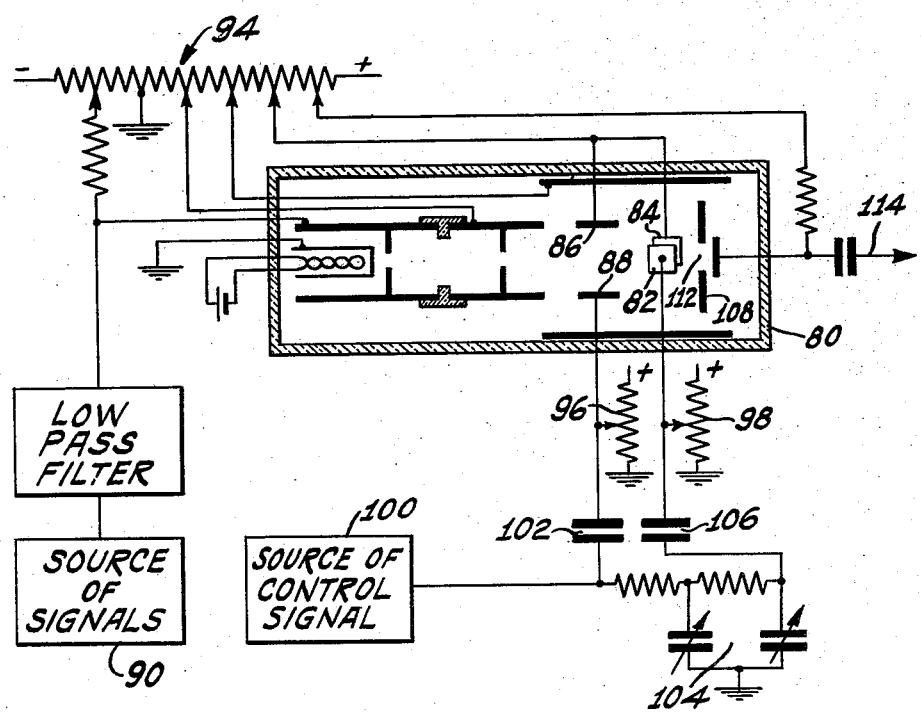
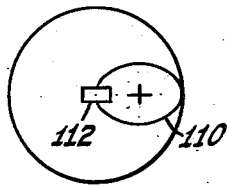
*Fig_3A*
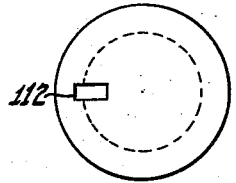
*Fig_3B*
INVENTOR
George W. Gray
ATTORNEY

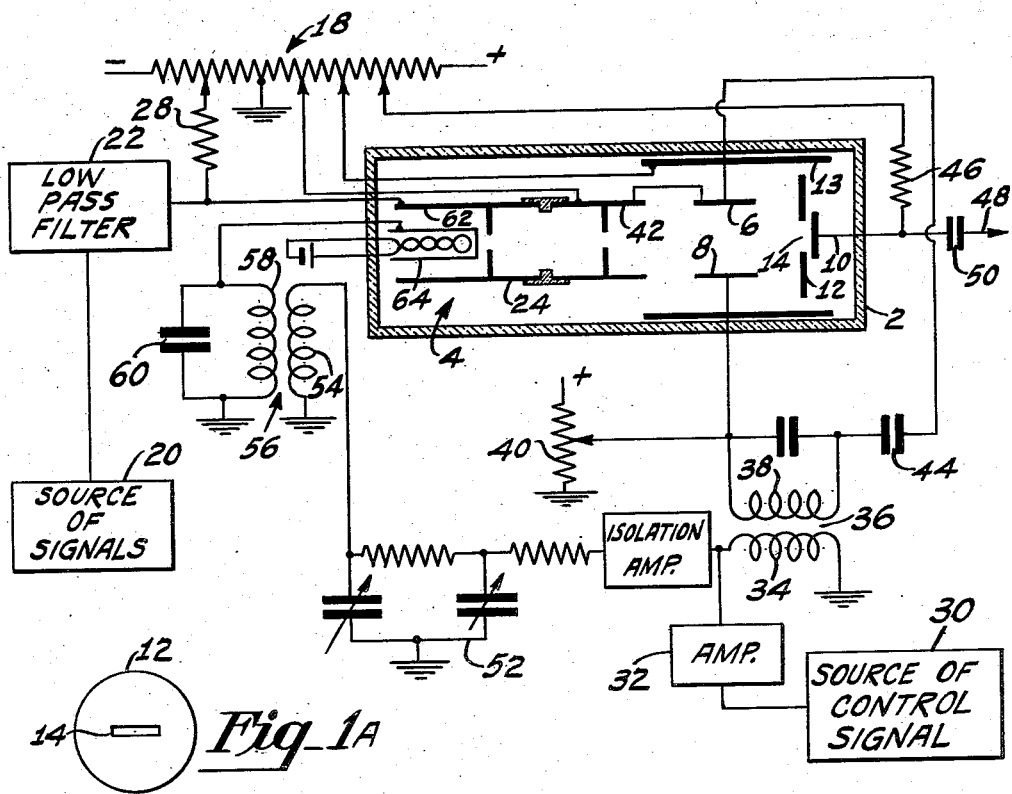
Fig_1
Fig_1A
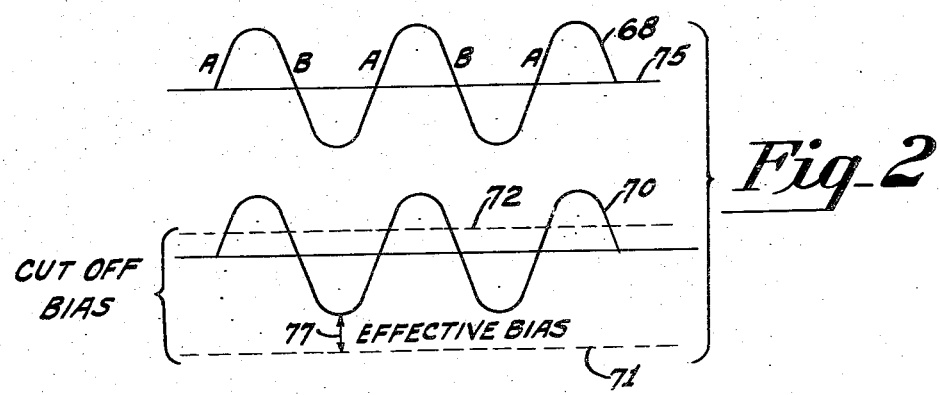
Fig_2
INVENTOR
George W. Gray
ATTORNEY

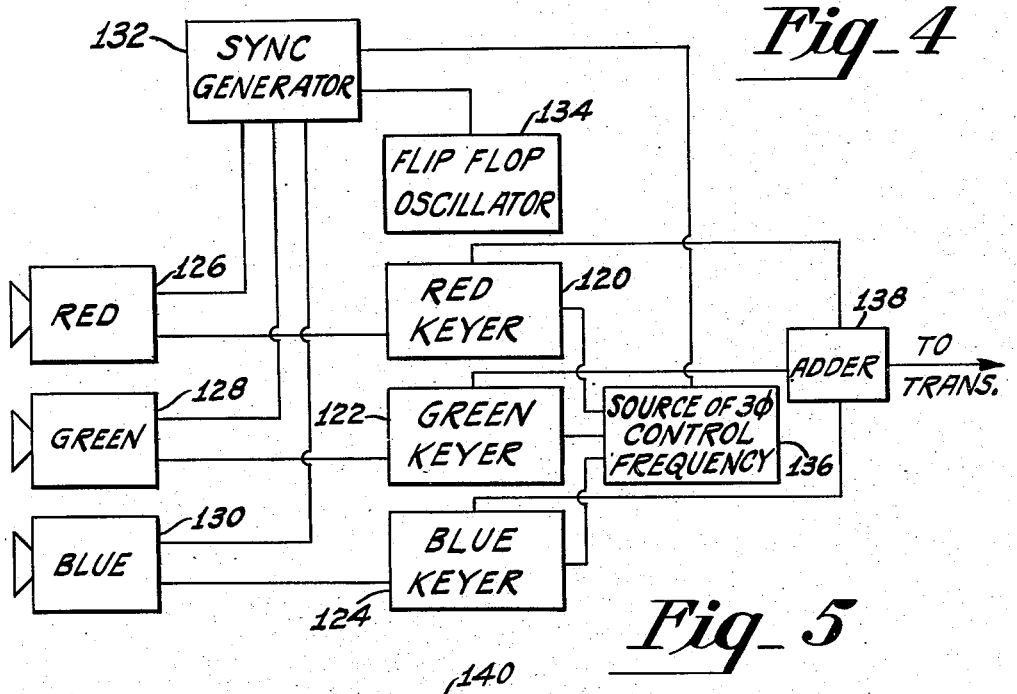
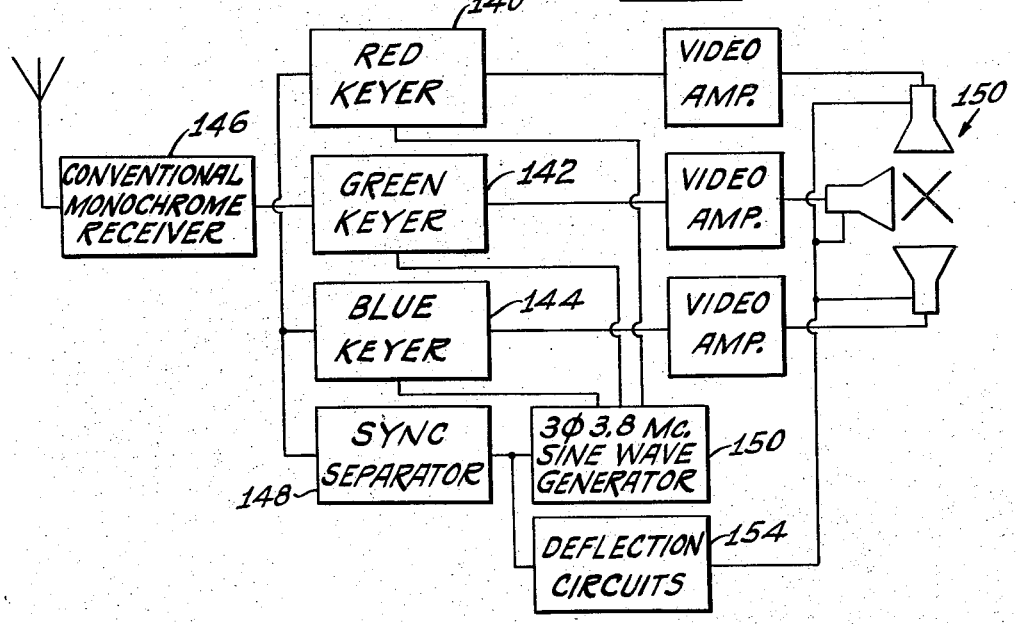

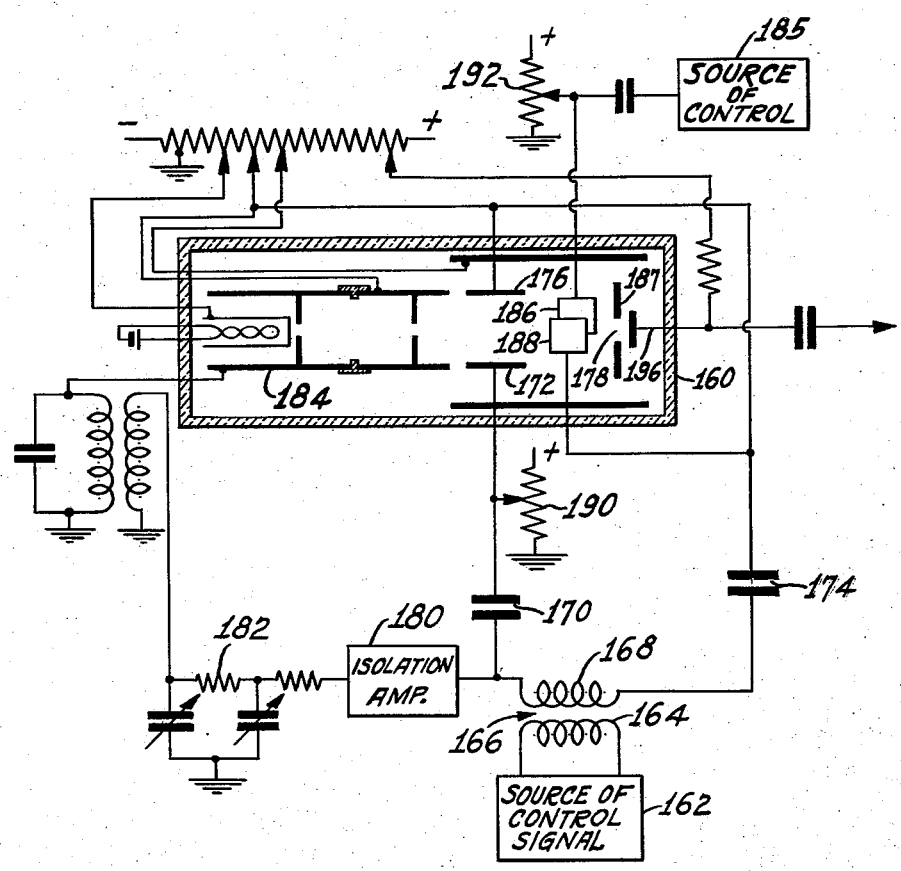
Fig_6

Patented Oct. 9, 1951

2,570,790

UNITED STATES PATENT OFFICE 2,570,790

SIGNAL SAMPLING

George W. Gray, Lambertville, N. J., assignor to Radio Corporation of America, a corporation of Delaware Application December 31, 1949, Serial No. 136,387

7 Claims. (Cl. 315—9)

This invention relates to the sampling or keying of signals required in many transmitters and receivers.

In the art of signal transmission, it often becomes necessary to sample or key the signal bearing the desired intelligence at intervals that are generally uniformly spaced in time. Where this sampling is to be carried out at a high frequency, and where it is desirable that each sampling pulse have as steep sides as possible, cathode ray tubes have been found useful because of their characteristic speed of response. However, previous to this invention, the frequency of signals required to control the sampling operation of the tube has been well within the frequency spectrum of the signals bearing the intelligence. Because of coupling between electrodes within the tube itself, as well as between the external circuits, the control frequency becomes mixed with the intelligence signals so as to introduce noticeable distortion therein.

According to this invention, such distortion is minimized or, in some cases, avoided by employing in a novel manner a control signal having a frequency that does not lie substantially within the frequency spectrum of the signal bearing the intelligence.

Whereas in previous apparatus, the centering of the electron beam was extremely critical, this difficulty is obviated by the use of this invention.

Therefore, the object of this invention is to provide an improved apparatus employing a cathode ray tube whereby intelligence bearing signals may be keyed under the influence of a control signal having a frequency that does not interfere with the signal bearing intelligence.

Other objects and advantages of this invention will become apparent from a detailed consideration of the drawings in which:

Figure 1 shows a cathode ray tube of the type employed in keying circuits in combination with circuit arrangements that operate in accordance with the principles of this invention;

Figure 1A illustrates a plan view of the mask and aperture employed in the cathode ray tube such as that shown in Figure 1;

Figure 2 illustrates wave forms occurring at different points in the circuit of Figure 1;

Figure 3 shows a cathode ray tube of the type previously employed for keying signals in combination with circuits that form a different embodiment of the principles of this invention;

Figure 3A shows a plan view of the aperture and mask employed in the cathode ray tube of Figure 3;

Figure 3B shows a plan view of the mask and aperture that may be substituted for the mask employed in the cathode ray tube of Figure 3;

Figure 4 shows in block diagram form the essential components of a color television transmitter employing the dot multiplex principle in which the different video signals may be keyed in accordance with the principles of this invention;

Figure 5 shows in block diagram form a receiver which is adapted to produce colored images from the signals conveyed by a transmitter such as shown in Figure 4; and Figure 6 shows an application of the principle of this invention to a signal transmission system employing the quantized signals.

Figure 1 illustrates one of several sampling devices constructed in accordance with the principles of this invention. The cathode ray tube 2 is of the type previously used in sampling apparatus and is equipped with a standard electron gun 4, a pair of deflection plates 6 and 8, a target 10 made of current conducting material, a mask 12 made of electron beam obstructing material, and a wall coating 13. The mask 12 is positioned between the electron gun 4 and the target 10 and has an aperture 14 opposite the target 10. A plan view of the mask 12 and aperture 14 is shown in Figure 1A. All the electrodes within the tube 2 including the target 10 and the wall coating 13 are supplied with suitable potentials in a manner well known to those skilled in the art by potentiometer arrangement generally indicated by the numeral 18. Focusing of the beam in this particular arrangement is attained by suitable adjustment of the potential of the wall coating 13. It will be apparent to those skilled in the art that beam deflection and beam focusing can also be accomplished by electromagnetic means.

The signals to be sampled or keyed are provided by source 20, and are coupled to the grid 24 of the electron gun 4 by grid leak resistor 28. The coupling may be direct or it may be clamped so that the video signals drive the grid negative in a manner well known to those skilled in the art. A low pass filter 22 may be inserted in the signal path to limit its upper frequency to a point that is at or below the control frequency described below. However, it is not essential to this invention. The grid leak resistor 28 is returned to a point of negative potential on potentiometer 18 which serves to bias the cathode ray tube in a well known manner.

In accordance with this invention, control or sweep voltages, which may be sinusoidal in form, are supplied by source 30 via amplifier 32 to the primary 34 of transformer 36. The secondary 38 of the transformer 36 is tuned to the frequency of the control signals. One end of the secondary 38 is connected directly to the deflection plate 8 and also to a potentiometer 40. The other deflection plate 6 is connected to the accelerating anode 42 of the electron gun 4 so as to receive a positive fixed potential, and the potential supplied by potentiometer 40 to deflection plate 8 can be made either greater or smaller than this amount so as to center the beam on the aperture 14 when no control signals are present. The opposite end of secondary 38 is coupled by blocking condenser 44 to deflection plate 6. The deflection plates 6 and 8 are thus connected in push-pull to the secondary 38, and the beam of electrons will be deflected up and down so as to scan a line segment, at least a portion of which lies across aperture 14.

In previous keying apparatus of this type, each time the beam scans across the aperture 14 in the mask 12, it strikes target 10 and develops a pulse of voltage across the target load resistor 49 that has an amplitude determined by the signal from source 20. This pulse is coupled to a suitable output circuit 48 by condenser 50. These pulses or samples of the signal supplied by source 20 appear in the output circuit 48 twice for each cycle of the deflection voltage wave applied to deflection plates 6 and 8.

However, in accordance with this invention, the beam is blanked out every other time that the deflection voltage is of such a value that the beam would pass through the aperture 14 and therefore only one sample is generated for each cycle of the deflection voltage. This is accomplished in the following manner: The control signals supplied to primary 34 are also applied to network 52 which changes their phase in a manner well known to those skilled in the art. This phase advanced control signal is connected to the primary 54 of transformer 56. The secondary 58 of transformer 53 is tuned to parallel resonance by condenser 60 at the frequency of the control signal. One end of this parallel resonant circuit is connected to ground, and the other end is connected to the cathode 64 of the electron gun 4.

Waveform 68 illustrates the control voltage wave supplied from source 30 and waveform 70 indicates the phase displaced control voltage wave that is applied to the cathode 64. The waveform 70 oscillates about ground potential and the dotted line 71 indicates the potential of the grid 64. Whenever the cathode voltage becomes more positive than the dotted line 72, the beam is cut off because the difference between dotted line 72 and the dotted line 71 represents the cut off bias for the tube. Assuming that the electron beam projected by the gun 4 is properly centered by adjustment of potentiometer 40, it will pass through the aperture 14 of mask 12 only when the control voltage wave 68 passes through the A. C. axis 75. Therefore, at points A on the waveform 68 the beam is cut off by the application of waveform 70 to the cathode 64, but at intermediate points B the beam is turned on. Due to the fact that the cathode potential is varied in accordance with the waveform 70, the bias of the tube varies, but this will have no effect on the output signal because the difference between the cathode and grid potentials is always the same at points B, which is the only time during which an output signal is generated. In other words, the effective operating bias of the tube is the voltage between the wave 70 and the dotted line 71 at points B, as indicated by numeral 77.

Although the phase shift of the control voltage wave applied to the cathode is preferably 90 degrees as shown in Figure 2, it is not limited thereto. One reason for selecting a phase shift of 90 degrees is that it permits the bias to be a minimum when the beam passes through the aperture, thereby producing maximum beam current at this time. A second reason is that slight variations in phase do not change the effective bias as much as they would be changed if the sample were taken at a point on the steeply sloping sides of the control wave that is applied to the cathode.

The width of the sample provided by target 10 depends only on the size of aperture 14 and the speed and size of the beam that scans across it. For this reason, as long as the beam is turned off on alternate scansions of the aperture, as at points A, it makes no difference how long it is turned on.

Even if the beam should not pass through aperture 14 at the points where waveform 68 crosses its A. C. axis 75, the sampled output of the apparatus will be uniformly spaced. In previous arrangements, the samples occurred twice during each cycle of the control voltage wave applied to the deflection plates with the result that inexact centering caused the samples to be spaced non-uniformly.

Figure 3 illustrates another embodiment of the invention in which the cathode ray tube 80 is the same as cathode ray tube 2 of Figure 1 except that an additional pair of deflection plates 82 and 84 are mounted so that the force they exert on the beam of electrons passing therebetween is at an angle with the force exerted by the pair of deflection plates 86 and 88. Preferably, this angle is 90 degrees, but it is not limited thereto. The signals to be sampled are supplied by source 90 and are coupled to the control grid of the gun structure in the same manner as in Figure 1 and therefore the details need not be repeated here.

The deflection system, however, differs from that of Figure 1 in the following respects. One plate from each pair, i. e., 84 and 86 are tied to a common positive fixed potential at the potentiometer 94 as shown. The opposite plates 82 and 88 are respectively connected to potentiometers 96 and 98 so that the beam may be centered in a manner well known to those skilled in the art. The control signal supplied by source 100 is coupled to plate 88 by blocking condenser 102. After having its phase changed, preferably but not necessarily by 90 degrees, by a network 104, which operates in the same way as network 52 of Figure 1, the control signal is coupled via blocking condenser 106 to deflection plate 82. As will be apparent to those skilled in the art, the beam will scan the mask 108 in a closed path that defines or encloses an area, such as indicated in Figure 3A by dotted line 110, once for each cycle of the control voltage. If the control voltage waves applied to the two pairs of deflection plates are of equal amplitude and exactly 90 degrees out of phase, the path 110 will be a circle. Whatever its shape, it is only necessary for purposes of this invention that it be centered by adjustments of potentiometers 96 and 98 so that it intersects aperture 112. By application of the control voltage and the phase displaced control voltage two different pairs of deflection plates a single sample of the intelligence signal from source 90 is provided to the output circuit 114 for each cycle of the control voltage as desired.

The mask and target may be arranged so that the aperture 112 is displaced from the central axis of the tube 80 in a manner shown in Figure 3B. This permits the beam to be centered, but otherwise no different function results.

Standard cathode ray tubes of the type used in oscilloscopes wherein the phosphor has a fast decay time may be substituted for those shown and described in connection with Figures 1 and 3. In these tubes the electron beam causes the phosphor on the face to emit light, and therefore masks of the same configuration as those shown in Figures 1 and 3 may be placed between the face of the tube and a photoelectric cell. Whenever the beam is opposite the aperture, light falls on the photoelectric cell, and it generates an output pulse having an amplitude proportional to the intensity of the light.

Figure 4 illustrates how any one of the keyers discussed above may be incorporated into a color television transmitter of the type in which the video signals that are transmitted successively represent the intensities of the different component colors employed. A full explanation of one such a transmitter may be found in a publication entitled "Synchronization for Color Dot Interlace in the RCA Color Television System" which was printed in October 1949 and distributed to the Federal Communications Commission on October 31, 1949. Any of the keyers discussed above may be substituted in the rectangles 120, 122 and 124 of Figure 4 of the drawings for the type of keyers described in the publication.

Figure 4 includes cameras 126, 128 and 130 which are adapted to supply video signals that vary respectively in accordance with the red, green and blue colors of the image to be televised. Sync generator 132 provides synchronizing pulses to the cameras 126, 128 and 130 which are employed to control the corresponding deflection circuits therein. Sync generator 132 and flip flop oscillator 134 cooperated to change the phase of the 3-phase control frequencies supplied by the source 136 by 180 degrees every other line. The output of the source 136 comprises three sine waves that are 120 degrees from each other and, in this way, the red, green and blue video signals are successively supplied to the adder 138. These groups of multiplexed video signals representing the different colors thus change phase with respect to a line start on every other line by 180 degrees.

In this particular system the sampling or keying frequency for any one color was chosen as 3.8 mc. which is at the upper end of the utilized video frequency spectrum. If cathode ray tube keyers of the type known before this invention were employed in such a system, the control frequency would necessarily be 1.9 mc., and as this lies in the middle of the video frequency spectrum, any leakage into the video circuits would produce serious distortion in the video signals. These difficulties can be avoided by using the keyer of this present invention in which the control signal is 3.8 mc. Leakage of a control signal of this frequency does not affect the video signals because they are keyed at this same rate, and a 3.8 mc. pattern is present in the image produced from said signals even in the absence of leakage.

The color television receiver shown in Figure 5 is designed to cooperate with the transmitter of Figure 4, as explained in the publication entitled "A Fifteen- by Twenty-Inch Projection Receiver for the RCA Color Television System" published in October 1949 and distributed to the Federal Communications Commission. Any of the keyers of this invention may be substituted for the keyers 140, 142 and 144 shown in Figure 5 of the drawings. The receiver of Figure 5 also includes a conventional monochrome receiver 146 of the type now used, a sync separator 148 which serves to change the phase of the three-phase generator 150 in synchronism with the phase changes of source 136 of Figure 4 at the transmitter. The output of the three-phase generator 150 is supplied to the keyers 140, 142 and 144 so that they pass successive samples of the received video signal, as was explained in connection with Figures 1 and 3. The outputs of the keyers 140, 142 and 144 are supplied to an image reproducing means generally indicated by the numeral 152. The sync separator 148 also supplies suitable information to the deflection circuits 154 that are employed with the image reproducing means 152.

Figure 6 illustrates how the keyers of this invention may be incorporated into a quantizing system in which a signal must be generated whenever the video signals are within each of several predetermined ranges. It is customary in such systems to key the video signals at a rate that is twice the cut off frequency of the transmission system. Therefore, if the video pass band were 4 mc., keying would occur at a rate of 8 mc. If cathode ray tube keyers of the type known prior to this invention are employed, the control frequency would be 4 mc., and therefore a fine pattern would be visible in the image. When, however, a keyer embodying the principles of this invention is employed, the keying control signal has twice as high a frequency, or 8 mc., and this frequency can easily be trapped out of the video circuits so that no pattern at all is visible in the final image.

Turning to the details of Figure 6 that are similar to those of Figure 1, there is shown a cathode ray tube 160 that is constructed in exactly the same way as tube 80 of Figure 3. The keying control signal is supplied by source 162 to the primary 164 of transformer 166. One end of the secondary 168 of transformer 166 is connected via blocking condenser 170 to vertical deflection plate 172. The other end of secondary 168 is connected via blocking condenser 174 to the other vertical deflection plate 176 so that the beam will scan back and forth across the aperture 178 to effect sampling as previously described. After passing through phase shifter 182 the keying control frequency is applied to the grid 184 of the cathode ray tube 160 so as to blank the beam every other time it crosses aperture 178. An isolation amplifier 180 may be employed if desired but is not essential to the operation of the system.

However, in contrast to Figure 1, the video signals are supplied from source 185 to horizontal deflection plate 186 so as to sweep the beam horizontally across the plate 187. Vertical deflection plate 176 and horizontal deflection plate 188 are tied to a suitable fixed potential. Vertical centering is achieved by adjustment of potentiometer 190 that is connected to vertical deflection plate 172. The setting of the potentiometer 192 that is connected to horizontal deflection plate 186 is determined by the center point of the range of values of the video signals for which there is to be an output signal supplied by target 196. The horizontal dimension of the aperture 178 and the amplitude of the video signals applied to horizontal deflection plate 166 determine the limits of this range of values.

In order to obtain an output signal from the apparatus of Figure 6, it is necessary that the beam pass through aperture 178. This only occurs when the video signals are such as to center the beam horizontally and the beam scans across aperture 178 in response to the keying control signals. It might be desirable in some arrangements to couple the video signals to the grid 184 so that the amplitudes of the output signals will be proportional to the video signals. However, in other applications it is sufficient that sampled uniform signals be provided at the output when the video signals are within a predetermined range.

Having thus described my invention, what is claimed is:

1. An apparatus for multiplexing a plurality of signals in time division comprising in combination a source of a plurality of independent signals, a plurality of cathode ray tubes each having a target, an electron gun for directing a beam of electrons toward said target, a control electrode for controlling the intensity of the beam and means for sweeping said beam of electrons, connections for applying one of said independent signals to one of said control electrodes, a source of sampling voltage waves, a phase splitter adapted to provide three equally spaced voltage waves from said sampling voltage wave, connections for applying each of said three spaced waves to a different one of said sweeping means, and means associated with each cathode ray tube adapted to permit electrons to reach said target only during a fractional portion of each cycle of the sampling voltage wave.

2. An apparatus for sampling video waves comprising in combination a cathode ray tube having a target, an electron gun including a cathode adapted to project a beam of electrons toward said target, an electrode for controlling the intensity of said beam, means for deflecting said beam and an apertured plate positioned between said electron gun and said target, a source of signals, the output of said source being applied to said control electrode, a source of voltage waves of sampling frequency, connections for applying said waves to said deflection means, a phase changer adapted to change the phase of said sampling frequency waves, the output of said phase changer being applied to said cathode.

3. An apparatus for developing an output signal whenever a given voltage wave lies within a predetermined range of values during predetermined intervals comprising in combination a cathode ray tube having a target, an electron gun adapted to project a beam of electrons toward said target, means for controlling the intensity of said beam, means for deflecting the beam in a different direction, a source of voltage waves of sampling frequency, the output of said source being applied to the latter deflecting means, means for shifting the voltage waves of sampling frequency, the output of said latter means being applied to said intensity control means, and an apertured plate, said plate being positioned between said electron gun and said target in such manner that the electrons can pass through said plate during at least a portion of its sweep.

4. An apparatus for multiplexing signals in time division comprising in combination a plurality of cathode ray tubes, each of said tubes having a target electrode, an electron gun adapted to project a beam of electrons toward said target electrode, means for deflecting said beam of electrons, an apertured plate mounted between said gun and said target, and means for controlling the intensity of said beam, a source of voltage waves of sampling frequency, phase splitting means to which said voltage waves are applied, each of the differently phased outputs of said phase splitter being applied to one of the deflecting means.

5. A sampling apparatus comprising in combination a cathode ray tube having a target, an electron gun for projecting electrons toward said target, an electrode for controlling the intensity of said beam, means for deflecting said beam, a mask having an aperture therein, said mask being positioned between said gun and said target, a source of signals having an output, the output being connected to said electrode, a source of control voltage waves of a predetermined frequency, the output of said source being applied to said deflecting means, a phase shifter to which said voltage waves are applied, and means for controlling the intensity of said beam in accordance with the output of said phase shifter.

6. A sampling apparatus comprising in combination a cathode ray tube having a target, an electron gun adapted to project a beam of electrons toward said target, a mask mounted between said target and said gun, an aperture in said mask opposite said target, first means for deflecting said beam in one direction, second means for deflecting said beam in a different direction, a source of voltage waves of sampling frequency, the output of said source being applied to said first deflecting means, means for changing the phase of the output of said source, the output of said phase changer being applied to said second deflecting means so that the beam describes a path enclosing an area at least a segment of said path intersecting said aperture.

7. A sampling apparatus such as described in claim 6 in which means are provided in said cathode ray tube for controlling the intensity of said beam of electrons.

GEORGE W. GRAY.

REFERENCES CITED

The following references are of record in the file of this patent:

UNITED STATES PATENTS

| Number | Name | Date |
| --- | --- | --- |
| 2,173,193 | Zworykin | Sept. 19, 1939 |
| 2,239,407 | Wagner | Apr. 22, 1941 |
| 2,450,602 | Levialdi | Oct. 5, 1948 |
| 2,474,812 | Arditi et al. | July 5, 1949 |